United States Patent
Byun et al.

(10) Patent No.: US 8,771,869 B2
(45) Date of Patent: Jul. 8, 2014

(54) SECONDARY BATTERY

(75) Inventors: Sangwon Byun, Yongin-si (KR); Sungbae Kim, Yongin-si (KR); Dukjung Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 505 days.

(21) Appl. No.: 12/929,871

(22) Filed: Feb. 22, 2011

(65) Prior Publication Data

US 2012/0100420 A1 Apr. 26, 2012

(30) Foreign Application Priority Data

Oct. 22, 2010 (KR) .................. 10-2010-0103265

(51) Int. Cl.
*H01M 2/30* (2006.01)
*H01M 2/04* (2006.01)
*H01M 2/02* (2006.01)

(52) U.S. Cl.
USPC .......................................... 429/179

(58) Field of Classification Search
None
See application file for complete search history.

(56) References Cited

U.S. PATENT DOCUMENTS

| | | | | |
|---|---|---|---|---|
| 7,160,643 B2 * | 1/2007 | Kunimoto et al. | | 429/97 |
| 2006/0051664 A1 * | 3/2006 | Tasai et al. | | 429/161 |
| 2007/0190409 A1 * | 8/2007 | Sakurai | | 429/159 |
| 2009/0142659 A1 * | 6/2009 | Lai et al. | | 429/163 |
| 2009/0186269 A1 * | 7/2009 | Kim et al. | | 429/179 |
| 2010/0068616 A1 * | 3/2010 | Uh | | 429/163 |
| 2010/0227212 A1 | 9/2010 | Kim | | |

FOREIGN PATENT DOCUMENTS

| | | |
|---|---|---|
| JP | 2003-092103 A | 3/2003 |
| JP | 2003-346886 A | 12/2003 |
| JP | 2006-324178 A | 11/2006 |
| JP | 2009-105075 A | 5/2009 |
| JP | 2010-097822 A | 4/2010 |
| KR | 10 2010-0099596 A | 9/2010 |

OTHER PUBLICATIONS

Korean Office Action in KR 10-2010-0103265, dated Feb. 7, 2012 (Byun, et al.).

* cited by examiner

*Primary Examiner* — Patrick Ryan
*Assistant Examiner* — Christopher Domone
(74) *Attorney, Agent, or Firm* — Lee & Morse, P.C.

(57) ABSTRACT

A secondary battery including an electrode assembly; a terminal electrically connected to the electrode assembly; and a case accommodating the electrode assembly and the terminal, wherein the terminal includes a collecting plate connected to the electrode assembly; a collecting terminal connected to the collecting plate and protruding out of the case; a terminal plate outside of the case, the terminal plate including a terminal through hole at one side thereof and a reinforcement member recess at another side thereof, the collecting terminal passing through the terminal through hole, and a female screw thread being provided to the reinforcement member recess; and a reinforcement member in the reinforcement member recess.

17 Claims, 4 Drawing Sheets

SECONDARY BATTERY

BACKGROUND

1. Field

Embodiments relate to a secondary battery.

2. Description of the Related Art

Secondary batterers are rechargeable, unlike primary batteries. A low capacity secondary battery including a battery cell in the form of a pack may be used in small portable electronic devices e.g., cellular phones and camcorders. A high capacity secondary battery including tens of battery cells connected to one another may be used as a power source for, e.g., driving a motor of electric scooters, hybrid vehicles, or electric vehicles.

Secondary batteries may be manufactured in various shapes, e.g., a cylindrical shape and a prismatic shape. An electrolyte and an electrode assembly formed by interposing a separator as an insulator between a positive electrode plate and a negative electrode plate may be installed in a case; and a cap plate may be installed on the case, so as to form a secondary battery. The electrode assembly may be connected with a positive terminal and a negative terminal, which may protrude through the cap plate and may be exposed to an exterior of the electrode assembly.

SUMMARY

Embodiments are directed to a secondary battery.

The embodiments may be realized by providing a secondary battery including an electrode assembly; a terminal electrically connected to the electrode assembly; and a case accommodating the electrode assembly and the terminal, wherein the terminal includes a collecting plate connected to the electrode assembly; a collecting terminal connected to the collecting plate and protruding out of the case; a terminal plate outside of the case, the terminal plate including a terminal through hole at one side thereof and a reinforcement member recess at another side thereof, the collecting terminal passing through the terminal through hole, and a female screw thread being provided to the reinforcement member recess; and a reinforcement member in the reinforcement member recess.

The reinforcement member may include a spring-shaped coil.

The reinforcement member may include a threaded insert.

The reinforcement member may include a hollowed part.

The collecting terminal may pass through the terminal plate and may be riveted thereto.

The secondary battery may further include an insulating lead coupled to an outer portion of the terminal plate.

The terminal plate may include a terminal body in which the terminal through hole and the reinforcement member recess are disposed; a terminal fixation recess in an upper portion of the terminal body, a rivet part formed by riveting an upper portion of the collecting terminal being fixedly hung on the terminal fixation recess; and a terminal rotation prevention recess in a lower surface of the terminal body, and the terminal through hole and the reinforcement member recess may be between upper and lower surfaces of the terminal body.

The terminal plate may further include a terminal coupling recess in a lower periphery of the terminal body.

The secondary battery may further include a cap assembly, the cap assembly including a cap plate sealing the case, wherein the collecting terminal passes through the cap plate, and the terminal plate is outside of the cap plate.

The cap assembly may include an upper insulation member between the terminal plate and the cap plate.

The upper insulation member may include protrusions on upper and lower surfaces thereof.

The cap plate may include a rotation prevention recess in an upper surface thereof, the rotation prevention recess corresponding to the protrusions on the lower surface of the upper insulation member.

The terminal plate may include a terminal rotation prevention recess in a lower surface thereof, the terminal rotation prevention recess corresponding to the protrusions on the upper surface of the upper insulation member.

The secondary battery may further include a bus bar on an upper portion of the terminal plate; and a screw passing through the bus bar, the screw being coupled to the reinforcement member.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
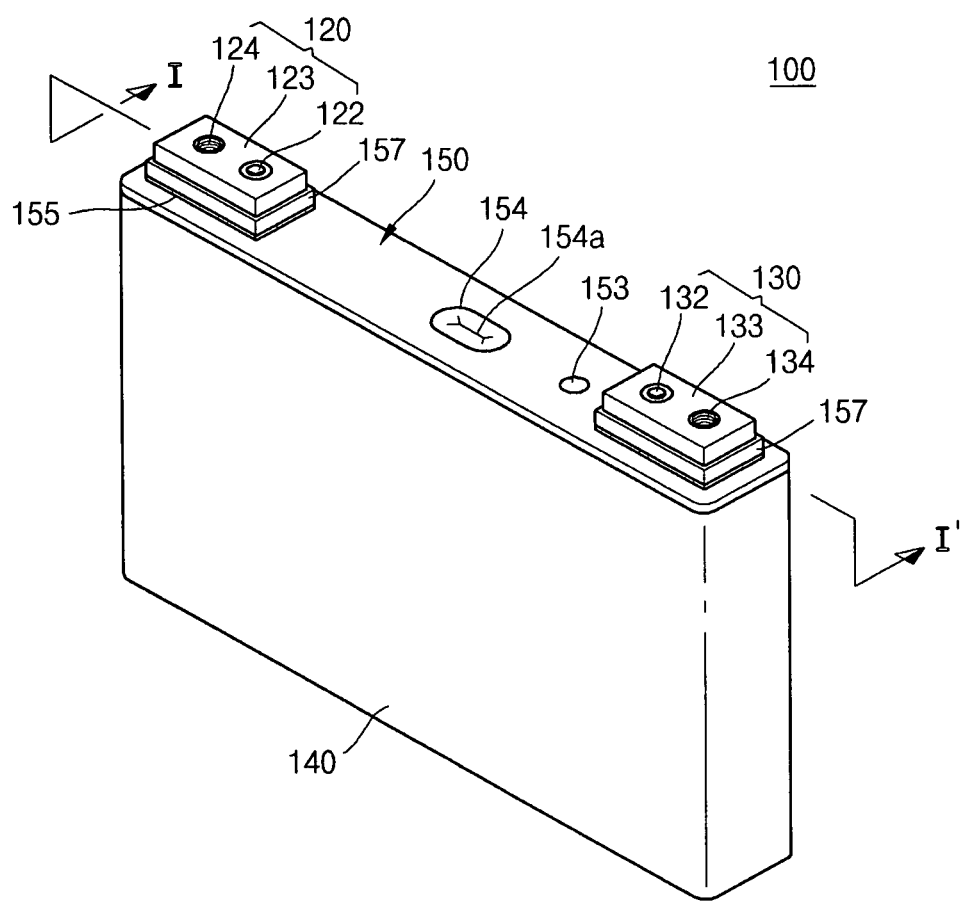
FIG. 1 illustrates a perspective view of a secondary battery according to an embodiment.

Korean Patent Application No. 10-2010-0103265, filed on Oct. 22, 2010, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
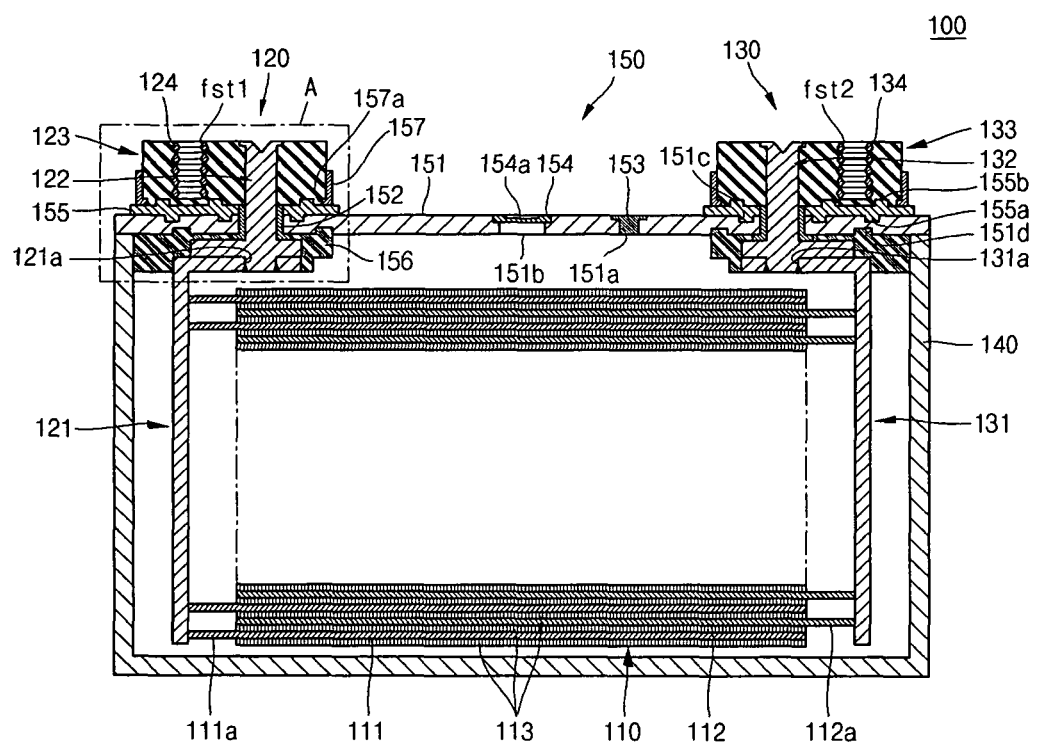
FIG. 2 illustrates a cross-sectional view taken along line I-I' of FIG. 1.

FIG. 1 illustrates a perspective view of a secondary battery according to an embodiment. FIG. 2 illustrates a cross-sectional view taken along line I-I' of FIG. 1.

Figure 3:
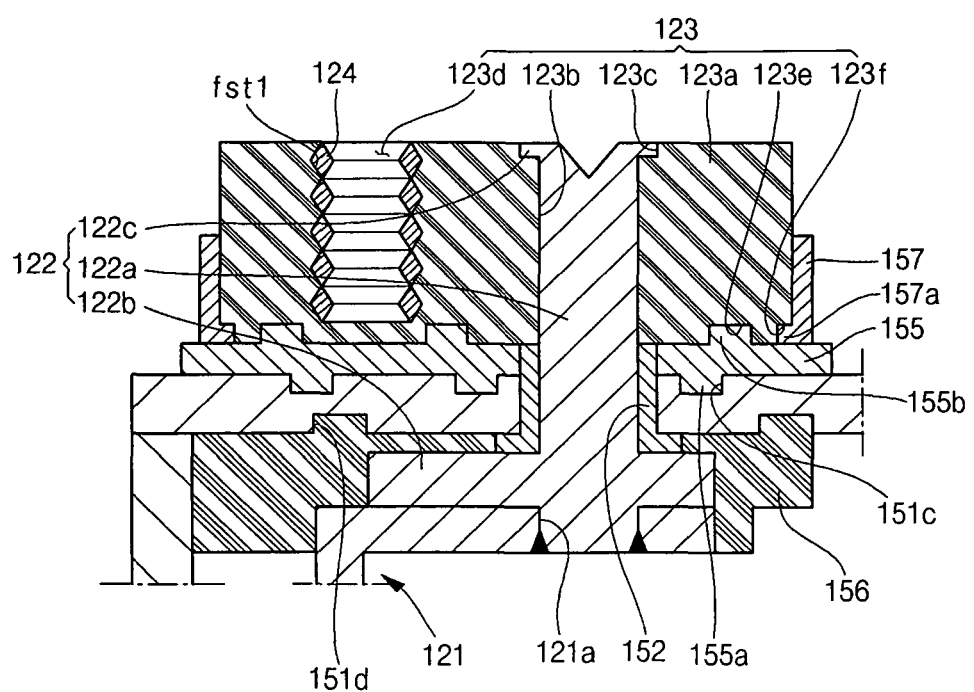
FIG. 3 illustrates an enlarged view of a portion A of FIG. 2.

FIG. 3 illustrates an enlarged view of a portion A of FIG. 2.

Referring to FIGS. 1 through 3, a secondary battery 100 according to the present embodiment may include an electrode assembly 110, a first terminal 120, a second terminal 130, a case 140, and a cap assembly 150.

The electrode assembly 110 may be formed by winding or stacking a first electrode plate 111, a separator 113, and a second electrode plate 112, which have thin plate or film shape. The first electrode plate 111 may function as a positive electrode or a negative electrode, and the second electrode plate 112 may have a polarity opposite to that of the first electrode 111.

The first electrode plate 111 may be formed by applying a first electrode active material, e.g., a transition metal oxide, on a first electrode collector formed of metal foil, e.g., aluminum foil. The first electrode plate 111 may include a first electrode non-coating portion 111a on which the first electrode active metal is not applied. The first electrode non-coating portion 111a may function as a passage for a current between the first electrode plate 111 and an outside of the first electrode plate 111. The material of the first electrode plate 111 is not limited herein.

The second electrode plate 112 may be formed by applying a second electrode active material, e.g., graphite or carbon, on a second electrode collector formed of metal foil, e.g., nickel or copper foil. The second electrode plate 112 may include a second electrode non-coating portion 112a on which the second electrode active metal is not applied. The second electrode non-coating portion 112a may function as a passage for a current between the second electrode plate 112 and an outside of the second electrode plate 112. The material of the second electrode plate 112 is not limited herein.

The first and second electrode plates 111 and 112 may change their poles with each other, e.g., the electrode plates may reverse polarities depending on a charging/discharging condition of the secondary battery 100.

The separator 113 may be disposed between the first electrode plate 111 and the second electrode plate 112 to prevent a short circuit and to facilitate movement of lithium ions. The separator 113 may be formed of, e.g., polyethylene, polypropylene, or combined film of polypropylene and polyethylene. However, material of the separator 113 is not limited thereto.

The electrode assembly 110 and an electrolyte may be disposed in the case 140. The electrolyte may include, e.g., an organic solvent such as ethylene carbonate (EC), propylene carbonate (PC), diethyl carbonate (DEC), ethyl methyl carbonate (EMC), or dimethyl carbonate (DMC), and a lithium salt such as $LiPF_6$ or $LiBF_4$. The electrolyte may be liquid, solid, or gel.

Ends of the electrode assembly 110 may be coupled with first and second terminals 120 and 130, which may be electrically connected to the first and second electrode plates 111 and 112, respectively.

The first terminal 120 may be formed of a metal or an equivalent thereof and may be electrically connected to the first electrode plate 111 of the electrode assembly 110. The first terminal 120 may include a first collecting plate 121, a first collecting terminal 122, a first terminal plate 123, and a first reinforcement member 124.

The first collecting plate 121 may be electrically connected to the electrode assembly 110. For example, the first collecting plate 121 may contact the first electrode non-coating portion 111a at an end of the electrode assembly 110. In an implementation, the first collecting plate 121 may be welded to the first electrode non-coating portion 111a. The first collecting plate 121 may have an approximately 'T' shape; and a first terminal hole 121a may be formed in an upper portion thereof. The first collecting terminal 122 may be fitted and coupled to the first terminal hole 121a. The first collecting plate 121 may be formed of, e.g., aluminum, aluminum alloy, and/or an equivalent thereof. However, the material of the first collecting plate 121 is not limited thereto.

The first collecting terminal 122 may pass through the cap plate 151 and may protrude a predetermined length upwardly therefrom. The first collecting terminal 122 may be electrically connected to the first collecting plate 121 at a lower side of the cap plate 151. In an implementation, the first collecting terminal 122 may be formed of, e.g., aluminum, aluminum alloy, and/or an equivalent thereof. However, the material of the first collecting terminal 122 is not limited thereto. In an implementation, the first connecting terminal 122 may include a first collecting body 122a, a first collecting flange 122b, and a first collecting fixation part 122c.

The first collecting body 122a may include an upper column protruding from an upper side of the cap plate 151 and a lower column connected to a lower portion of the upper column and extending from a lower side of the cap plate 151. The first collecting body 122a may have, e.g., a cylindrical shape, but the embodiments are not limited thereto.

The first collecting flange 122b may extend horizontally from a side part of the lower column of the first collecting body 122a. The first collecting flange 122b may prevent the first collecting terminal 122 from being removed from the cap plate 151. A portion of the lower column of the first collecting body 122a, which may be connected to the lower portion of the first collecting flange 122b, may be fitted to the first terminal hole 121a of the first collecting plate 121, and may be welded.

The first collecting fixation part 122c may protrude horizontally from a side part of an end of the upper column of the first collecting terminal 122. The first collecting fixation part 122c may fix the first collecting terminal 122 to the first terminal plate 123. The first collecting fixation part 122c may be formed by, e.g., riveting an end of the upper column of the first collecting terminal 122.

The first terminal plate 123 may be disposed outside of the case 140, e.g., at or on the upper side of the cap plate 151. The upper column of the first collecting terminal 122 may pass through a side of the first terminal plate 123 and may be coupled thereto. The first reinforcement member 124 may pass through another side of the first terminal plate 123 and may be coupled thereto. The first terminal plate 123 may have, e.g., an approximately tetragonal column shape. The first terminal plate 123 may be electrically and mechanically connected to the first collecting terminal 122. The first terminal plate 123 may be formed of, e.g., stainless steel, copper, copper alloy, aluminum, aluminum alloy, and/or an equivalent thereof, but the embodiments are not limited thereto. The first terminal plate 123 may be electrically insulated from the cap plate 151 by an upper insulation member 155. In an implementation, e.g., if the first terminal plate 123 and the cap plate 151 have the same polarity, the first terminal plate 123 may be electrically connected to the cap plate 151 without the upper insulation member 155. In an implementation, the first terminal plate 123 may include a first terminal body 123a, a first terminal through hole 123b, a first terminal fixation recess 123c, a first reinforcement member recess 123d, a first terminal rotation prevention recess 123e, and a first terminal coupling recess 123f.

The first terminal body 123a may contact the upper insulation member 155 and may function as a base for stably placing the first terminal plate 123 on the upper insulation member 155.

The first terminal through hole 123b may be disposed at a side of the first terminal body 123a and may extend from an upper surface of the first terminal body 123a to a lower surface thereof. The first terminal through hole 123b may provide a space through which the upper column of the first collecting terminal 122 may pass.

The first terminal fixation recess 123c may be disposed in an upper portion of the first terminal body 123a and may have a diameter greater than that of the first terminal hole 121a.

The first terminal fixation recess 123c may provide a space for fixedly hanging or accommodating the first collecting fixation part 122c.

The first reinforcement member recess 123d may be disposed at another side of the first terminal body 123a and may extend from the upper surface of the first terminal body 123a to a lower portion thereof. The first reinforcement member 124 may be fitted and coupled to the first reinforcement member recess 123d. A first female screw thread fst1 may be formed on an inner wall of the first reinforcement member recess 123d. The first female screw thread fst1 may guide the first reinforcement member 124 to be fitted into the first reinforcement member recess 123d and may physically couple the first reinforcement member 124 to the inside of the first reinforcement member recess 123d.

The first terminal rotation prevention recess 123e may be formed in the lower surface of the first terminal body 123a and may be coupled to a second protrusion 155b on an upper surface of the upper insulation member 155. The first terminal rotation prevention recess 123e may prevent rotation of the first terminal plate 123 when a screw 211 (see FIG. 4) for coupling a bus bar 210 (see FIG. 4) to the first terminal plate 123 is coupled to the first reinforcement member 124.

The first terminal coupling recess 123f may be formed at a lower periphery of the first terminal body 123a, e.g., in a portion where an edge of the first terminal body 123a contacts the upper insulation member 155. The first terminal coupling recess 123f may be coupled to a protrusion 157a of an insulating lead 157. The first terminal coupling recess 123f may couple the insulating lead 157 to the first terminal plate 123.

The first reinforcement member 124 may be guided along the first female screw thread fst1 and may be fitted into the first reinforcement member recess 123d. The first reinforcement member 124 may reinforce the first terminal plate 123 so that the screw 211 (see FIG. 4) may be electrically and mechanically coupled with large torque to the first terminal plate 123. For example, the screw 211 (see FIG. 4) may be coupled to the first reinforcement member 124. In an implementation, the first reinforcement member 124 may be a spring-shaped coil having a hollowed part, e.g., a threaded insert such as those marketed under the trademark Heli-Coil. The first reinforcement member 124 may be formed of a metal, e.g., copper, copper alloy, aluminum, aluminum alloy, stainless steel, and/or an equivalent thereof, to improve its strength. However, the material of the first reinforcement member 124 is not limited thereto.

The second terminal 130 and the first terminal 120 may be formed of, e.g., gold and/or an equivalent thereof; and the second terminal 130 may be connected to the second electrode plate 112. The second terminal 130 may include a second collecting plate 131, a second collecting terminal 132, a second terminal plate 133, and a second reinforcement member 134.

The second collecting plate 131 may contact the second electrode non-coating portion 112a protruding from another end of the electrode assembly 110. In an implementation, the second collecting plate 131 may be welded to the second electrode non-coating portion 112a. The second collecting plate 131 may have an approximately ']' shape; and a second terminal hole 131a may be formed in an upper portion thereof. The second collecting terminal 132 may be fitted and coupled to the second terminal hole 131a. The second collecting plate 131 may be formed of, e.g., copper, copper alloy, and/or an equivalent thereof. However, the material of the second collecting plate 131 is not limited thereto.

The second collecting terminal 132 may pass through the cap plate 151 and may protrude a predetermined length upwardly therefrom. The second collecting terminal 132 may be electrically connected to the second collecting plate 131 at the lower side of the cap plate 151. In an implementation, the second collecting terminal 132 may be formed of, e.g., copper, copper alloy, and/or an equivalent thereof. However, the material of the second collecting terminal 132 is not limited thereto. The first and second collecting terminals 122 and 132 may be symmetrical with respect to the center of the cap plate 151. Thus, a further, repeated description thereof will be omitted.

The second terminal plate 133 may be disposed outside of the case 140, e.g., at the upper side of the cap plate 151. The upper column of the second collecting terminal 132 may pass through a side of the second terminal plate 133 and may be coupled thereto. The second reinforcement member 134 may pass through another side of the second terminal plate 133 and may be coupled thereto. The second terminal plate 133 may have an approximately tetragonal column shape. The second terminal plate 133 may be electrically and mechanically connected to the second collecting terminal 132. The second terminal plate 133 may be formed of, e.g., stainless steel, copper, copper alloy, aluminum, aluminum alloy, and/or an equivalent thereof, but the embodiments are not limited thereto. The first and second terminal plates 123 and 133 may be symmetrical with respect to the center of the cap plate 151. Thus, a further, repeated description thereof will be omitted.

The second reinforcement member 134 may be guided along a second female screw thread fst2 and may be fitted into a reinforcement member recess. The second reinforcement member 134 may be the same as the first reinforcement member 124. Thus, a repeated description thereof will be omitted.

The case 140 may be formed of a conductive metal, e.g., aluminum, aluminum alloy, or steel plated with nickel, and may have an approximately hexahedron shape having an opening through which the electrode assembly 110, the first terminal 120, and the second terminal 130 may be inserted and placed. Although the opening is not shown in FIG. 2 since an assembly of the case 140 and the cap assembly 150 is illustrated in FIG. 2, a periphery of the cap assembly 150 substantially forms the opening. An inner surface of the case 140 may be treated to be electrically insulated from the electrode assembly 110, the first and second terminals 120 and 130, and the cap assembly 150.

The cap assembly 150 may be coupled to the case 140. For example, the cap assembly 150 may include the cap plate 151, a sealing gasket 152, a plug 153, a safety vent 154, the upper insulation member 155, a lower insulation member 156, and insulating leads 157.

The cap plate 151 may close or seal the opening of the case 140, and may include the same material as that of the case 140. The cap plate 151 may have an electrolyte injection hole 151a and a vent hole 151b. The cap plate 151 may have a rotation prevention recess 151c in an upper surface thereof and a coupling recess 151d in a lower surface thereof. The cap plate 151 may be coupled to the case 140 through, e.g., laser welding. The cap plate 151 may have the same polarity as that of the first electrode plate 111 and the first terminal 120. Thus, the cap plate 151 and the case 140 may have the same polarity.

The sealing gasket 152 may be formed of an electrically insulated material and may be disposed between the cap plate 151 and each of the first and second collecting terminals 122 and 132 to seal a space between the cap plate 151 and each of the first and second collecting terminals 122 and 132. The sealing gasket 152 may preventingress of moisture into the secondary battery 100 or leakage of the electrolyte from the secondary battery 100.

The plug 153 may close the electrolyte injection hole 151a of the cap plate 151. The safety vent 154 may be installed in the vent hole 151b of the cap plate 151 and may have a notch 154a to be opened at a predetermined pressure.

The upper insulation member 155 may be disposed between the cap plate 151 and each of the first and second terminal plates 123 and 133. For example, the upper insulation members 155 may be coupled to the cap plate 151. In an implementation, the upper insulation member 155 may include a first protrusion 155a that is formed on a lower surface thereof and coupled to the rotation prevention recess 151c of the cap plate 151. The upper insulation member 155 may be coupled to each of the first and second terminal plates 123 and 133. In an implementation, the upper insulation members 155 may include the second protrusions 155b that are formed on upper surfaces thereof and coupled to the first terminal rotation prevention recess 123e of the first terminal plate 123 and a second terminal rotation prevention recess of the second terminal plate 133. The upper insulation members 155 may be closely adhered to the sealing gaskets 152. The upper insulation member 152 may insulate the cap plate 151 from each of the first and second terminal plates 123 and 133.

The lower insulation member 156 may be disposed between the cap plate 151 and each of the first and second collecting plates 121 and 131 to prevent an unnecessary and undesirable short circuit. For example, the lower insulation members 156 may prevent a short circuit between the first collecting plate 121 and the cap plate 151 and a short circuit between the second collecting plate 131 and the cap plate 151. The lower insulation member 156 may also be disposed between the cap plate 151 and each of the first and second collecting terminals 122 and 132 to prevent an unnecessary short circuit between the cap plate 151 and each of the first and second collecting terminals 122 and 132.

The insulating leads 157 may be formed on an upper side of the upper insulation members 155 to surround an outer surface of the first terminal body 123a of the first terminal plate 123 and an outer surface of a second terminal body of the second terminal plate 133. The insulating leads 157 may be formed of an insulating material to prevent an unnecessary and undesirable short circuit between an external device and each of the first and second terminal plates 123 and 133. Each of the insulating leads 157 may include the protrusion 157a at a lower end thereof. The protrusions 157a may be coupled to the first terminal coupling recess 123f of the first terminal plate 123 and a second terminal coupling recess of the second terminal plate 133 to couple the insulating lead 157 to each of the first and second terminal plates 123 and 133.

As described above, the secondary battery 100 according to the present embodiment may include the first and second terminal plates 123 and 133 (including the first and second reinforcement member recesses 123d and 133d provided with the first and second female screw threads fst1 and fst2, and the first and second reinforcement members 124 and 134 fitted into the first and second reinforcement member recesses 123d and 133d), so as to reinforce the first and second terminal plates 123 and 133.

Thus, the secondary battery 100 may facilitate coupling of screws 211 (see FIG. 4) to the first and second terminal plates 123 with large amounts of torque without affecting the first and second collecting terminals 122 and 132, thereby improving coupling force between bus bars 210 (see FIG. 4) and the first and second terminal plates 123 and 133.

Figure 4:
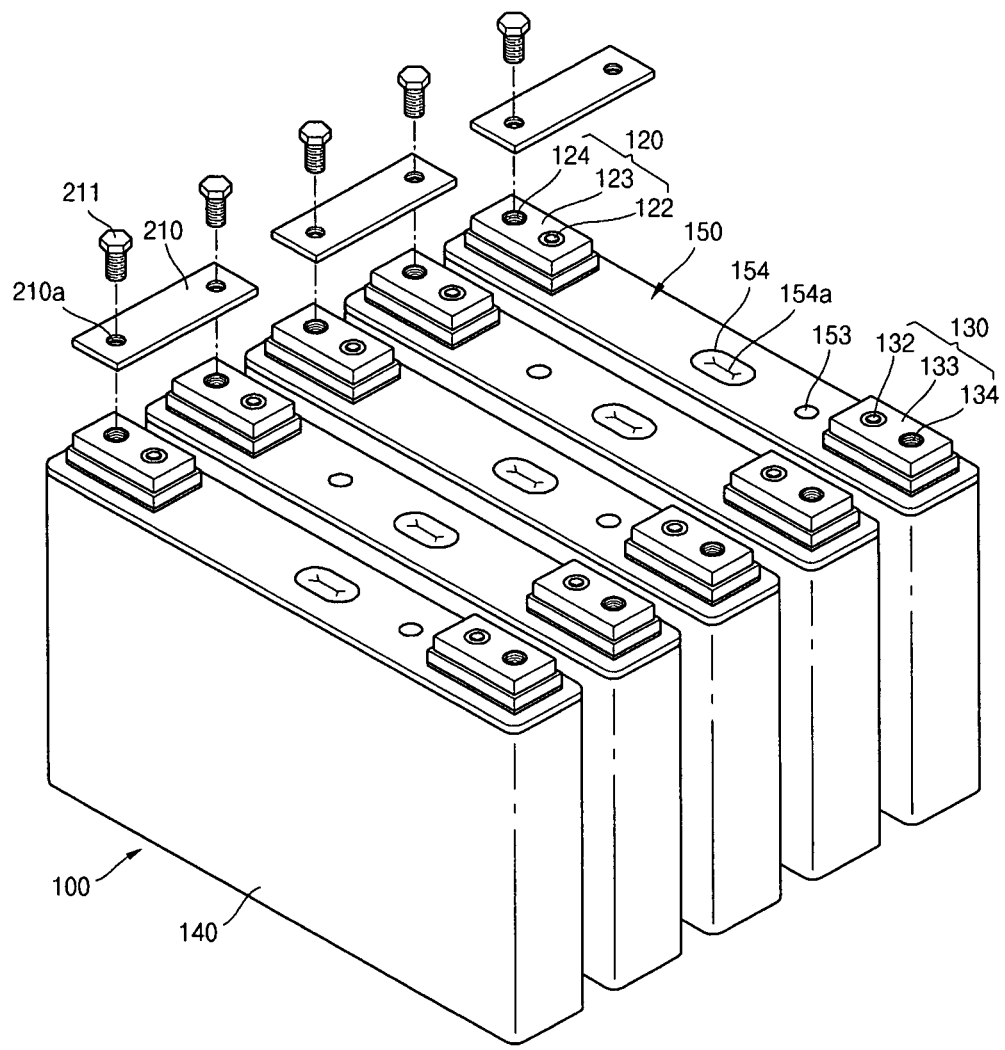
FIG. 4 illustrates a schematic view of a stage in a method of coupling a secondary battery with bus bars according to an embodiment.

FIG. 4 illustrates a schematic view of a stage in a method of coupling a secondary battery with bus bars according to an embodiment.

As illustrated in FIG. 4, when a plurality of the secondary batteries 100 are provided, the secondary batteries 100 may be connected in series and/or in parallel through conductive bus bars 210. The bus bar 210 may include through holes 210a at sides thereof. The screws 211 passing through the through holes 210a may be coupled to the first and second reinforcement members 124 and 134 such that the bus bars 210 are coupled to the first terminal plate 123 and the second terminal plate 133 of the secondary battery 100. Accordingly, the bus bars 210 may be coupled with large torque through the screws 211 to the first or second terminal plate 123 or 133 reinforced by the first or second reinforcement member 124 or 134, and may be be securely adhered thereto.

Accordingly, the bus bars 210 may be securely coupled through the screws 211 to the first and second terminal plates 123 and 133 without affecting the first and second collecting terminals 122 and 132, thereby improving coupling force between the bus bars 210 and the first and second terminal plates 123 and 133.

The secondary battery according to an embodiment may include the terminal plates having the reinforcement member recesses provided with the female screw threads and the reinforcement members fitted into the reinforcement member recesses, thereby reinforcing the terminal plates.

Thus, the secondary battery according to an embodiment may facilitate coupling of the screws to the terminal plates with large torque without affecting the collecting terminals, thereby improving the coupling force between the bus bars and the terminal plates.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
an electrode assembly;
a terminal electrically connected to the electrode assembly; and
a case accommodating the electrode assembly and the terminal,
wherein the terminal includes:
a collecting plate connected to the electrode assembly;
a collecting terminal connected to the collecting plate and protruding out of the case;
a terminal plate outside of the case and electrically connected to the collecting terminal, the terminal plate including a terminal fixation recess in an upper portion thereof and a rivet part formed by riveting an upper portion of the collecting terminal being fixedly hung on the terminal fixation recess, a terminal through hole at one side thereof and a reinforcement member recess at another side thereof, the collecting terminal passing through the terminal through hole, and a female screw thread being provided to the reinforcement member recess; and
a reinforcement member in the reinforcement member recess.

2. The secondary battery as claimed in claim 1, wherein the reinforcement member includes a spring-shaped coil.

3. The secondary battery as claimed in claim 1, wherein the reinforcement member includes a threaded insert.

4. The secondary battery as claimed in claim 1, wherein the reinforcement member includes a hollowed part.

5. The secondary battery as claimed in claim 1, wherein the collecting terminal passes through the terminal plate and is riveted thereto.

6. The secondary battery as claimed in claim 1, further comprising an insulating lead coupled to an outer portion of the terminal plate.

7. The secondary battery as claimed in claim 1, wherein:
the terminal plate includes:
 a terminal body in which the terminal through hole and the reinforcement member recess are disposed;
 the terminal fixation recess in an upper portion of the terminal body; and
 a terminal rotation prevention recess in a lower surface of the terminal body, and
 the terminal through hole and the reinforcement member recess are between upper and lower surfaces of the terminal body.

8. The secondary battery as claimed in claim 7, wherein the terminal plate further includes a terminal coupling recess in a lower periphery of the terminal body.

9. The secondary battery as claimed in claim 1, further comprising a cap assembly, the cap assembly including a cap plate sealing the case, wherein:
the collecting terminal passes through the cap plate, and
the terminal plate is outside of the cap plate.

10. The secondary battery as claimed in claim 9, wherein the cap assembly includes an upper insulation member between the terminal plate and the cap plate.

11. The secondary battery as claimed in claim 10, wherein the upper insulation member includes protrusions on upper and lower surfaces thereof.

12. The secondary battery as claimed in claim 11, wherein the cap plate includes a rotation prevention recess in an upper surface thereof, the rotation prevention recess corresponding to the protrusions on the lower surface of the upper insulation member.

13. The secondary battery as claimed in claim 11, wherein the terminal plate includes a terminal rotation prevention recess in a lower surface thereof, the terminal rotation prevention recess corresponding to the protrusions on the upper surface of the upper insulation member.

14. The secondary battery as claimed in claim 1, further comprising:
a bus bar on an upper portion of the terminal plate; and
a screw passing through the bus bar, the screw being coupled to the reinforcement member.

15. The secondary battery as claimed in claim 1, wherein the reinforcement member recess is spaced apart from the terminal hole.

16. The secondary battery as claimed in claim 15, wherein the terminal hole is closer to a center of the secondary battery than the reinforcement member recess.

17. The secondary battery as claimed in claim 1, wherein the reinforcement member recess is not concentric with the terminal hole.

* * * * *